L. CONANT.
COPY-HOLDER.
No. 169,893.
Patented Nov. 16, 1875.
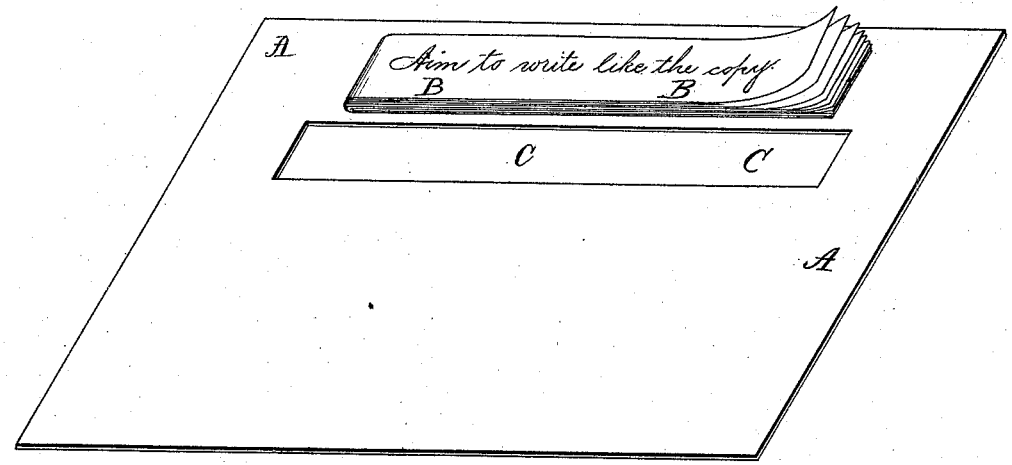
Witnesses:
C. Shackelford
H. W. Taylor
Inventor:
Luther Conant

UNITED STATES PATENT OFFICE.

LUTHER CONANT, OF GENEVA, ILLINOIS.

IMPROVEMENT IN COPY-HOLDERS.

Specification forming part of Letters Patent No. 169,893, dated November 16, 1875; application filed March 29, 1875.

*To all whom it may concern:*

Be it known that I, LUTHER CONANT, of Geneva, in the county of Kane and State of Illinois, have invented certain Improvements in Gages or Copy-Holders, of which the following is a specification:

My invention relates to the combination of copies with the movable gage or copy-holder, in such a manner that the copies shall be next to, above, and parallel with an open writing-space in the gage or copy-holder, the object sought being to place the copies in the most favorable position for correct imitation.

The drawing represents the upper surface of the gage or copy-holder, with the copies in the proper relative position designed by my invention.

A A is the gage or copy-holder, and should be of about equal length and breadth with the page to be written upon. It may be made of any suitable material, heavy blotting-paper being preferable. C C is an oblong aperture or slot, either closed or open at one end, in the gage or copy-holder A A near its upper side, and corresponding in size with the copies to be used. B B are the copies, attached to the gage or copy-holder A A in a position immediately above and parallel with the aperture C C. If desired, the copies themselves may form the upper side of the aperture or slot.

The gage or copy-holder A A is placed upon the page to be written, so that the oblong aperture or writing-space C C shall be parallel with the ruling. The copies are then in the most favorable position for correct imitation—viz., immediately above and parallel with the line or space to be written upon, which is seen through the aperture C C. This line having been written, the gage or copy-holder A A is moved up or down the page, covering all previous writing, and presenting, as before, the copy alone to the eye of the writer.

I claim as my invention—

The combination, with the gage or copy-holder A, having the slot C, of the copies B B, as and for the purposes set forth.

LUTHER CONANT.

Witnesses:
C. SHACKELFORD,
W. M. TAYLOR.